United States Patent
Kato et al.

(10) Patent No.: US 9,932,462 B2
(45) Date of Patent: *Apr. 3, 2018

(54) RUBBER COMPOSITION FOR TIRE RIM CUSHION OR RUBBER FINISHING, AND PNEUMATIC TIRE

(71) Applicant: THE YOKOHAMA RUBBER CO., LTD., Minato-Ku, Tokyo (JP)

(72) Inventors: Manabu Kato, Hiratsuka (JP); Ryota Takahashi, Hiratsuka (JP); Takahiro Okamatsu, Hiratsuka (JP); Yoshiaki Kirino, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/310,965

(22) PCT Filed: Dec. 19, 2014

(86) PCT No.: PCT/JP2014/083742
§ 371 (c)(1),
(2) Date: Nov. 14, 2016

(87) PCT Pub. No.: WO2015/173989
PCT Pub. Date: Nov. 19, 2015

(65) Prior Publication Data
US 2017/0073506 A1    Mar. 16, 2017

(30) Foreign Application Priority Data

May 16, 2014  (JP) .................................. 2014-102241
May 16, 2014  (JP) .................................. 2014-102243

(51) Int. Cl.
*B60C 1/00* (2006.01)
*C08L 7/00* (2006.01)
*C08C 19/22* (2006.01)
*C08L 15/00* (2006.01)

(52) U.S. Cl.
CPC ...... *C08L 7/00* (2013.01); *B60C 1/00* (2013.01); *C08C 19/22* (2013.01); *C08L 15/00* (2013.01); *C08L 2205/03* (2013.01)

(58) Field of Classification Search
CPC ........ C08L 7/00; C08L 15/00; C08L 2205/03; B60C 1/00
USPC .......................................................... 524/495
See application file for complete search history.

(56) References Cited

U.S. PATENT DOCUMENTS

| | | | | |
|---|---|---|---|---|
| 3,792,031 | A | * 2/1974 | Udding | ................... C08C 19/22 525/333.1 |
| 7,569,639 | B2 | * 8/2009 | Choi | ......................... B60C 1/00 525/189 |
| 2006/0084730 | A1 | 4/2006 | Fukushima et al. | |
| 2015/0240060 | A1 | 8/2015 | Wada | |

FOREIGN PATENT DOCUMENTS

| JP | 2008-517071 A |   | 5/2008 |
|----|---------------|---|--------|
| JP | 2008-208163 A |   | 9/2008 |
| JP | 2013-032471 A |   | 2/2013 |
| JP | 2013032471    | * | 2/2013 |
| JP | 2014-031425 A |   | 2/2014 |
| JP | 2014-034623 A |   | 2/2014 |

OTHER PUBLICATIONS

Product Information of Ultrasil 7000GR, Jan. 2017.*

* cited by examiner

*Primary Examiner* — Hui Chin
(74) *Attorney, Agent, or Firm* — Carrier Blackman & Associates, P.C.; Joseph P. Carrier; Anne G. Sabourin

(57) ABSTRACT

A rubber composition for a tire rim cushion or rubber finishing contains a diene rubber and a filler containing a carbon black. The diene rubber contains a natural rubber and/or an isoprene rubber, and a modified polymer that is obtained by reacting a nitrone compound with a double bond of a conjugated diene polymer. The content of the natural rubber and/or the isoprene rubber in the diene rubber is from 30 to 60 mass %, the content of the modified polymer in the diene rubber is from 8 to 70 mass %, the content of the filler is from 60 to 90 parts by mass per 100 parts by mass of the diene rubber, and the nitrogen adsorption specific surface area of the carbon black is from 60 to 150 m$^2$/g. Such rubber composition has excellent low heat build-up and ozone resistance when formed into a tire.

19 Claims, 1 Drawing Sheet

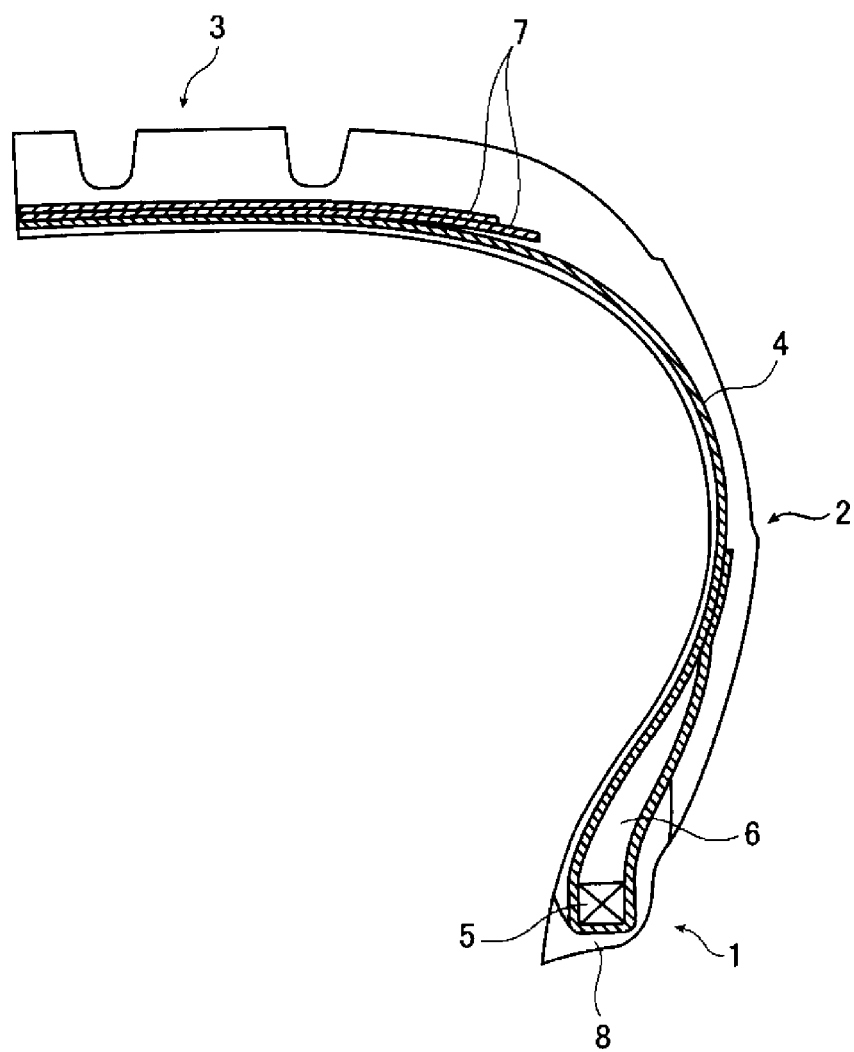

RUBBER COMPOSITION FOR TIRE RIM CUSHION OR RUBBER FINISHING, AND PNEUMATIC TIRE

TECHNICAL FIELD

The present invention relates to a rubber composition for a tire rim cushion or rubber finishing and a pneumatic tire.

BACKGROUND ART

A rim cushion is provided on the outer surface of a bead portion of a pneumatic tire in a manner that the rim cushion is in close contact with a rim when the tire is mounted on a rim of a wheel.

Furthermore, for the finishing of a pneumatic tire, a rubber sheet that does not use fibers (so-called rubber finishing) has been used to reduce the weight and/or the cost of the tire.

For example, Patent Document 1 discloses "a rubber composition for tire rim cushion or rubber finishing comprising: from 1 to 30 parts by mass of a polyrotaxane compound having a cyclic molecule with blocked isocyanate group, a straight chain molecule that skewers the cyclic molecule, and terminal groups disposed at both ends of the straight chain molecule preventing the cyclic molecule from being detached from the straight chain molecule, and from 70 to 90 parts by mass of a carbon black whose nitrogen adsorption specific surface area ($N_2SA$) is from 90 to 130 $m^2/g$, per 100 parts by mass of a rubber component comprising from 40 to 60 parts by mass of a natural rubber and from 60 to 40 parts by mass of a diene rubber having a modified group capable of reacting with an isocyanate group" ([Claim 1]).

Furthermore, Patent Document 2 discloses "a rubber composition for a tire rim cushion or rubber finishing comprising from 55 to 75 parts by mass of a carbon black (1) having a nitrogen adsorption specific surface area of not less than 35 $m^2/g$ and less than 50 $m^2/g$ and from 5 to 20 parts by mass of a carbon black (2) having a nitrogen adsorption specific surface area of not less than 50 $m^2/g$ and not greater than 95 $m^2/g$, per 100 parts by mass of a rubber component containing from 30 to 70 mass % of butadiene rubber having a cis-1,4 bond content of not less than 97% and a Mooney viscosity (ML1+4) of not less than 45 at 100° C., (T-cp)/(ML1+4), which is a ratio of (T-cp) [cps], a viscosity of a 5 mass % toluene solution at 25° C., to the Mooney viscosity, being at least 2.0, and from 30 to 70 mass % of other diene rubbers; the total of the carbon blacks (1) and (2) being from 60 to 95 parts by mass".

CITATION LIST

Patent Literature

Patent Document 1: Japanese Unexamined Patent Application Publication No. 2014-34623
Patent Document 2: Japanese Unexamined Patent Application Publication No. 2014-31425

SUMMARY OF INVENTION

Technical Problem

When the inventors of the present invention prepared the rubber compositions described in Patent Documents 1 and 2 and produced tires, the inventors found that the durability (e.g. ozone resistance or wear resistance) thereof needs to be further enhanced, considering that higher levels of durability will be required in the future. Furthermore, it was also found that the low heat build-up of the obtained tires was not always satisfactory to the level that is required recently.

Therefore, an object of the present invention is to provide a rubber composition for a tire rim cushion or rubber finishing, which exhibits excellent low heat build-up and durability when formed into a tire; and a pneumatic tire that uses the rubber composition.

SUMMARY OF INVENTION

As a result of diligent research to solve the above problems, the inventors have found that the problems described above can be solved by using a diene rubber, which is a combination of a natural rubber and/or an isoprene rubber, and a modified polymer that is obtained by modifying a conjugated diene polymer with a nitrone compound, and using a filler containing a carbon black having a specific nitrogen adsorption specific surface area in a specific amount, and thus completed the present invention.

Specifically, the inventors discovered that the object described above can be achieved by the following features.

[1] A rubber composition for a tire rim cushion or rubber finishing, the rubber composition comprising: a diene rubber and a filler containing a carbon black;
the diene rubber containing a natural rubber and/or an isoprene rubber, and a modified polymer that is obtained by reacting a nitrone compound with a double bond of a conjugated diene polymer;
a content of the natural rubber and/or the isoprene rubber in the diene rubber being from 30 to 60 mass %;
a content of the modified polymer in the diene rubber being from 8 to 70 mass %;
a content of the filler being from 60 to 90 parts by mass per 100 parts by mass of the diene rubber; and a nitrogen adsorption specific surface area of the carbon black being from 60 to 150 $m^2/g$.

[2] The rubber composition for a tire rim cushion or rubber finishing according to [1], where the diene rubber contains the natural rubber,
a content of the natural rubber in the diene rubber is from 30 to 60 mass %, and
a content of the carbon black is from 67 to 90 parts by mass per 100 parts by mass of the diene rubber.

[3] The rubber composition for a tire rim cushion or rubber finishing according to [1], where the filler further contains silica,
a content of the carbon black is from 5 to 85 parts by mass per 100 parts by mass of the diene rubber,
a content of the silica is from 5 to 85 parts by mass per 100 parts by mass of the diene rubber, and a total content of the carbon black and the silica is from 60 to 90 parts by mass per 100 parts by mass of the diene rubber.

[4] The rubber composition for a tire rim cushion or rubber finishing according to [3], where a CTAB adsorption specific surface area of the silica is from 50 to 230 $m^2/g$.

[5] The rubber composition for a tire rim cushion or rubber finishing according to any one of [1] to [4], where the nitrone compound is a compound selected from the group consisting of N-phenyl-α-(4-carboxyphenyl)nitrone, N-phenyl-α-(3-carboxyphenyl)nitrone, N-phenyl-α-(2-carboxyphenyl)nitrone, N-(4-carboxyphenyl)-α-phenylnitrone, N-(3-carboxyphenyl)-α-phenylnitrone, and N-(2-carboxyphenyl)-α-phenylnitrone.

[6] The rubber composition for a tire rim cushion or rubber finishing according to any one of [1] to [5], where a degree of modification of the modified polymer is from 0.02 to 4.0 mol %, where "degree of modification" refers to a proportion (mol %) of double bonds modified with the nitrone compound relative to all the double bonds of conjugated diene contained in the conjugated diene polymer.

[7] The rubber composition for a tire rim cushion or rubber finishing according to any one of [1] to [6], where an amount of the nitrone compound that is reacted with the double bond of the conjugated diene polymer is from 0.1 to 10 parts by mass per 100 parts by mass of the diene rubber.

[8] The rubber composition for a tire rim cushion or rubber finishing according to any one of [1] to [7], where the modified polymer is a modified polymer obtained by reacting the nitrone compound with a double bond of a butadiene rubber.

[9] A pneumatic tire comprising the rubber composition described in any one of [1] to [8] in a tire rim cushion or rubber finishing.

Advantageous Effects of Invention

As described below, according to the present invention, a rubber composition for a tire rim cushion or rubber finishing, which exhibits low heat build-up and durability when formed into a tire; and a pneumatic tire that uses the rubber composition can be provided.

BRIEF DESCRIPTION OF DRAWING

FIG. 1 is a partial cross-sectional schematic view of a tire that represents one embodiment of a pneumatic tire of the present invention.

DESCRIPTION OF EMBODIMENT

The rubber composition for a tire rim cushion or rubber finishing of the present invention and the pneumatic tire of the present invention will be described below.

In this specification, a numerical range represented using "(from) . . . to . . ." refers to a range including a numerical values preceding "to" as a lower limit value and a numerical value following "to" as a upper limit value, respectively.

Rubber Composition for Tire Rim Cushion or Rubber Finishing

The rubber composition for a tire rim cushion or rubber finishing of the present invention (hereinafter, also referred to as "rubber composition of the present invention") contains a diene rubber and a filler containing a carbon black.

Note that the diene rubber contains a natural rubber and/or an isoprene rubber, and a modified polymer that is obtained by reacting a nitrone compound with a double bond of a conjugated diene polymer. The content of the natural rubber and/or the isoprene rubber in the diene rubber is from 30 to 60 mass %, and the content of the modified polymer in the diene rubber is from 8 to 70 mass %.

Furthermore, the content of the filler is from 60 to 90 parts by mass per 100 parts by mass of the diene rubber, and the nitrogen adsorption specific surface area of the carbon black is from 60 to 150 m$^2$/g.

It is conceived that the rubber composition of the present invention exhibits excellent low heat build-up and durability (e.g. ozone resistance or wear resistance) since the rubber composition has such a configuration.

As described above, the rubber composition of the present invention contains a modified polymer that is obtained by modifying a conjugated diene polymer with a nitrone compound. Because of this, the nitrone-modified moiety of the modified polymer interacts with the carbon black in the composition (also interacts with the silica in the composition in the case where the composition contains silica) and enhances dispersibility of the carbon black (also enhances dispersibility of the silica in the composition in the case where the composition contains silica). It is conceived that, as a result, the Payne effect is reduced and excellent low heat build-up is achieved when the composition is formed into a tire. It is also conceived that the wear resistance and ozone resistance are enhanced due to the interaction.

This is also deduced from the fact that, as shown in working examples and comparative examples described below, the cases where the modified polymer is contained (working examples) exhibit superior low heat build-up compared to that of the case where no modified polymer is contained (Comparative Example 1).

Furthermore, this is also deduced from the fact that, as shown in working examples and comparative examples described below, the cases where the modified polymer is contained (Working Examples 10 to 13) exhibit superior low heat build-up and wear resistance compared to those of the cases where no modified polymer is contained (Comparative Examples 5 and 6).

Each of the components contained in the rubber composition of the present invention will be described in detail hereinafter.

Diene Rubber

The diene rubber contained in the rubber composition of the present invention contains a natural rubber and/or an isoprene rubber, and a modified polymer that is obtained by modifying a conjugated diene polymer with a nitrone compound. Note that the content of the natural rubber and/or the isoprene rubber in the diene rubber is from 30 to 60 mass %, and the content of the modified polymer in the diene rubber is from 8 to 70 mass %.

The diene rubber may contain another rubber component except the natural rubber and/or the isoprene rubber and the modified polymer described above. Such another rubber component is not particularly limited, and examples thereof include a butadiene rubber (BR), aromatic vinyl-conjugated diene copolymer rubber (e.g. styrene butadiene rubber (SBR)), acrylonitrile-butadiene copolymer rubber (NBR), butyl rubber (IIR), halogenated butyl rubber (Br-IIR, Cl-IIR), chloroprene rubber (CR), and the like. Among these, a butadiene rubber (BR) is preferable.

Natural Rubber and/or Isoprene Rubber

As described above, the diene rubber contained in the rubber composition of the present invention contains a natural rubber and/or an isoprene rubber. From the perspective of wear resistance, a natural rubber and an isoprene rubber are preferably contained, and a natural rubber is more preferably contained. From the perspective of ozone resistance, a natural rubber is preferably contained.

The content of the natural rubber and/or the isoprene rubber in the diene rubber is not particularly limited as long as the content is from 30 to 60 mass %; however, from the perspectives of wear resistance, weatherability, and the like, the content is preferably from 35 to 55 mass %.

Modified Polymer

As described above, the diene rubber contained in the rubber composition of the present invention contains a modified polymer that is obtained by modifying a conjugated diene polymer with a nitrone compound.

Conjugated Diene Polymer

The conjugated diene polymer used in the production of the modified polymer is not particularly limited. Specific examples thereof include a natural rubber (NR), isoprene rubber (IR), butadiene rubber (BR), aromatic vinyl-conjugated diene copolymer rubber (e.g. SBR), acrylonitrile-butadiene copolymer rubber (NBR), butyl rubber (IIR), halogenated butyl rubber (Br-IIR, Cl-IIR), chloroprene rubber (CR), and the like. Among these, a butadiene rubber (BR) is preferable. That is, the modified polymer is preferably a modified polymer obtained by reacting a nitrone compound with a double bond of the butadiene rubber.

Nitrone Compound

The nitrone compound used in the production of the modified polymer is not particularly limited as long as the nitrone compound is a compound having a nitrone group represented by Formula (1) below.

[Chemical Formula 1]

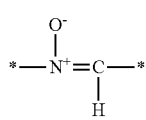

Formula (1)

In Formula (1) above, * indicates a bond position.

The nitrone compound is preferably a compound represented by Formula (2) below.

[Chemical Formula 2]

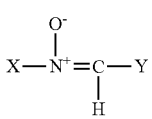

Formula (2)

In Formula (2) above, X and Y each independently represent an aliphatic hydrocarbon group, an aromatic hydrocarbon group, or an aromatic heterocycle group that may have a substituent.

Examples of the aliphatic hydrocarbon group represented by X or Y include alkyl groups, cycloalkyl groups, alkenyl groups, and the like. Examples of the alkyl group include a methyl group, an ethyl group, a n-propyl group, an isopropyl group, a n-butyl group, an isobutyl group, a sec-butyl group, a tert-butyl group, a n-pentyl group, an isopentyl group, a neopentyl group, a tert-pentyl group, a 1-methylbutyl group, a 2-methylbutyl group, a 1,2-dimethylpropyl group, a n-hexyl group, a n-heptyl group, a n-octyl group, and the like. Among these, alkyl groups having from 1 to 18 carbons are preferable, and alkyl groups having from 1 to 6 carbons are more preferable. Examples of the cycloalkyl group include a cyclopropyl group, a cyclobutyl group, a cyclopentyl group, a cyclohexyl group, and the like. Among these, cycloalkyl groups having from 3 to 10 carbons are preferable, and cycloalkyl groups having from 3 to 6 carbons are more preferable. Examples of the alkenyl group include a vinyl group, a 1-propenyl group, an allyl group, an isopropenyl group, a 1-butenyl group, a 2-butenyl group, and the like. Among these, alkenyl groups having from 2 to 18 carbons are preferable, and alkenyl groups having from 2 to 6 carbons are more preferable.

Examples of the aromatic hydrocarbon group represented by X or Y include aryl groups, aralkyl groups, and the like.

Examples of the aryl group include a phenyl group, a naphthyl group, an anthryl group, a phenanthryl group, a biphenyl group, and the like. Among these, aryl groups having from 6 to 14 carbons are preferable, aryl groups having from 6 to 10 carbons are more preferable, and a phenyl group and a naphthyl group are even more preferable.

Examples of the aralkyl group include a benzyl group, a phenethyl group, a phenylpropyl group, and the like. Among these, aralkyl groups having from 7 to 13 carbons are preferable, aralkyl groups having from 7 to 11 carbons are more preferable, and a benzyl group is even more preferable.

Examples of the aromatic heterocycle group represented by X or Y include a pyrrolyl group, a furyl group, a thienyl group, a pyrazolyl group, an imidazolyl group (an imidazole group), an oxazolyl group, an isoxazolyl group, a thiazolyl group, an isothiazolyl group, a pyridyl group (a pyridine group), a furan group, a thiophene group, a pyridazinyl group, a pyrimidinyl group, a pyrazinyl group, and the like. Among these, a pyridyl group is preferable.

The substituent that may be included in the group represented by X or Y is not particularly limited. Examples thereof include alkyl groups having from 1 to 4 carbons, hydroxy groups, amino groups, nitro groups, carboxy groups, sulfonyl groups, alkoxy groups, halogen atoms, and the like. Among these, carboxy groups are preferable.

Note that examples of the aromatic hydrocarbon group having such a substituent include aryl groups having a substituent, such as a tolyl group and a xylyl group; aralkyl groups having a substituent, such as a methylbenzyl group, an ethylbenzyl group, and a methylphenethyl group; and the like.

The compound represented by Formula (2) above is preferably a compound represented by Formula (3) below.

[Chemical Formula 3]

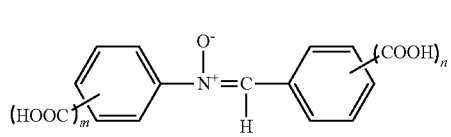

Formula (3)

In Formula (3), m and n each independently represent an integer from 0 to 5, and a sum of m and n is 1 or greater.

The integer represented by m is preferably an integer from 0 to 2, and more preferably an integer 0 or 1, because solubility to a solvent during nitrone compound synthesis is better, thereby making the synthesis easier.

The integer represented by n is preferably an integer from 0 to 2, and more preferably an integer of 0 or 1, because solubility to a solvent during nitrone compound synthesis is better, thereby making the synthesis easier.

Furthermore, the sum of m and n (m+n) is preferably from 1 to 4, and more preferably 1 or 2.

The carboxynitrone represented by Formula (3) is not particularly limited, but is preferably a compound selected from the group consisting of N-phenyl-α-(4-carboxyphenyl)nitrone represented by Formula (3-1) below, N-phenyl-α-(3-carboxyphenyl)nitrone represented by Formula (3-2) below, N-phenyl-α-(2-carboxyphenyl)nitrone represented by Formula (3-3) below, N-(4-carboxyphenyl)-α-phenylnitrone represented by Formula (3-4) below, N-(3-carboxyphenyl)-α-phenylnitrone represented by Formula (3-5)

below, and N-(2-carboxyphenyl)-α-phenylnitrone represented by Formula (3-6) below.

[Chemical Formula 4]

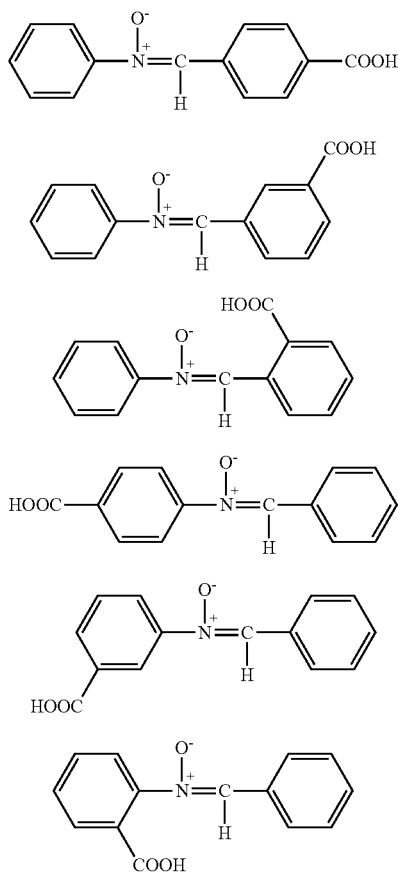

(3-1)
(3-2)
(3-3)
(3-4)
(3-5)
(3-6)

The method of synthesizing the nitrone compound is not particularly limited, and conventionally known methods can be used. For example, a nitrone compound having a nitrone group is obtained by agitating a compound having a hydroxyamino group (—NHOH) and a compound having an aldehyde group (—CHO) at a molar ratio of the hydroxyamino group to the aldehyde group (—NHOH/—CHO) of 1.0 to 1.5 in the presence of an organic solvent (e.g. methanol, ethanol, tetrahydrofuran, and the like) at room temperature for 1 to 24 hours to allow the both groups to react.

Method of Producing Modified Polymer

The method of producing the modified polymer in which a nitrone compound is reacted with a double bond of a conjugated diene polymer is not particularly limited; however, an example is a method in which the conjugated diene polymer described above and the nitrone compound described above are blended at 100 to 200° C. for 1 to 30 minutes.

When blended as such, a cycloaddition reaction occurs between the double bond of the conjugated diene contained in the conjugated diene polymer and the nitrone group in the nitrone compound to form a five-membered ring as described in Formula (4) or Formula (5) below. Note that Formula (4) below represents a reaction between a 1,4-bond and a nitrone compound, and Formula (5) below represents a reaction between a 1,2-vinyl bond and a nitrone compound. Furthermore, Formula (4) and (5) represent reactions in the case where the conjugated diene is butadiene (1,3-butadiene); however, even when the conjugated diene is other than butadiene, the five-membered ring is obtained by a similar reaction.

[Chemical Formula 5]

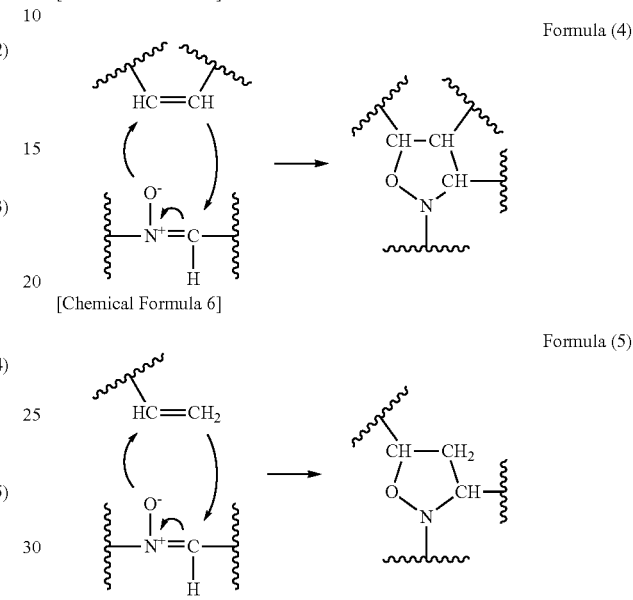

Formula (4)

[Chemical Formula 6]

Formula (5)

The amount of the nitrone compound to be reacted with the double bond of the conjugated diene polymer is not particularly limited; however, the amount is preferably from 0.1 to 10 parts by mass, and more preferably from 0.3 to 5 parts by mass, per 100 parts by mass of the conjugated diene polymer.

Degree of Modification

The degree of modification of the modified polymer is not particularly limited; however, the degree of modification is preferably from 0.02 to 4.0 mol %, and more preferably from 0.10 to 2.0 mol %.

Here, "degree of modification" refers to a proportion (mol %) of double bonds modified with the nitrone compound relative to all the double bonds of conjugated diene contained in the conjugated diene polymer, and more specifically refers to a proportion (mol %) of the structure of Formula (4) above or Formula (5) above that is formed due to the modification by the nitrone compound. The degree of modification can be determined by, for example, performing NMR measurement of the conjugated diene polymer and the modified polymer (that is, the polymer before and after the modification).

Note that, in the present specification, the modified polymer having the degree of modification of 100 mol % also corresponds to the diene rubber.

The content of the modified polymer in the diene rubber is not particularly limited as long as the content is from 8 to 70 mass %; however, from the perspective of achieving even better low heat build-up and durability (wear resistance) when a tire is formed, the content is preferably from 20 to 60 mass %, and more preferably from 40 to 60 mass %.

Filler

The filler contained in the rubber composition of the present invention is a filler containing a carbon black.

The content of the filler is from 60 to 90 parts by mass, preferably greater than 60 parts by mass but 85 parts by mass or less, and more preferably from 70 to 85 parts by mass, per 100 parts by mass of the diene rubber.

Carbon Black

The carbon black contained in the rubber composition of the present invention is not particularly limited as long as the carbon black has the nitrogen adsorption specific surface area of 60 to 150 m$^2$/g.

Furthermore, the nitrogen adsorption specific surface area ($N_2SA$) of the carbon black is preferably greater than 60 m$^2$/g but 145 m$^2$/g or less, more preferably from 70 to 145 m$^2$/g from the perspective of ozone resistance, and more preferably from 70 to 130 m$^2$/g from the perspective of wear resistance.

Note that the nitrogen adsorption specific surface area ($N_2SA$) is a value of the amount of nitrogen adsorbed to a surface of carbon black, measured in accordance with JIS K6217-2:2001 (Part 2: Determination of specific surface area—Nitrogen adsorption methods—Single-point procedures).

From the perspective of ozone resistance, the content of the carbon black is preferably from 67 to 90 parts by mass, more preferably greater than 67 parts by mass but 90 parts by mass or less, and even more preferably from 70 to 85 parts by mass, per 100 parts by mass of the diene rubber.

Furthermore, when the filler further contains silica as described below, the content of the carbon black is preferably from 5 to 85 parts by mass, and more preferably from 10 to 75 parts by mass, per 100 parts by mass of the diene rubber, and even more preferably from 10 to 30 parts by mass from the perspective of achieving even better low heat build-up, and even more preferably from 35 to 60 parts by mass from the perspective of achieving even better durability (wear resistance).

Silica

The filler may further contain silica from the perspective of wear resistance and the like.

The silica contained in the rubber composition of the present invention has the cetyltrimethylammonium bromide (CTAB) adsorption specific surface area of preferably 50 to 230 m$^2$/g, more preferably from 100 to 185 m$^2$/g, and even more preferably from 100 to 140 m$^2$/g.

Note that the CTAB adsorption specific surface area is an alternative characteristic of the surface area of the silica that can be utilized for adsorption to the silane coupling agent. The CTAB adsorption specific surface area is a value determined by measuring the amount of CTAB adsorption to the silica surface in accordance with JIS K6217-3:2001 "Part 3: How to Determine Specific Surface Area—CTAB Adsorption Method".

The content of the silica is preferably from 5 to 85 parts by mass, and more preferably from 10 to 80 parts by mass, per 100 parts by mass of the diene rubber, and even more preferably from 25 to 45 parts by mass from the perspective of achieving even better wear resistance, and even more preferably from 50 to 75 parts by mass from the perspective of achieving even better low heat build-up.

Total Content of Carbon Black and Silica

The total content of the carbon black and the silica is preferably from 60 to 90 parts by mass, more preferably greater than 60 parts by mass but 85 parts by mass or less, and even more preferably from 70 to 85 parts by mass, per 100 parts by mass of the diene rubber from the perspectives of low heat build-up and wear resistance.

The mass ratio of the carbon black to the silica (carbon black/silica) is preferably 1 or greater, and more preferably 1.5 or greater, from the perspective of achieving even better wear resistance.

Furthermore, the mass ratio is preferably less than 1, and more preferably 0.5 or less, from the perspective of achieving even better low heat build-up.

Optional Component

The rubber composition of the present invention may contain another additive as necessary in a range that does not inhibit the object of the present invention.

Examples of the additive include various additives typically used in rubber compositions, such as fillers except the carbon black and the silica, silane coupling agents, zinc oxide (zinc white), stearic acid, resins for adhesion, peptizing agents, anti-aging agents, waxes, processing aids, aroma oils, liquid polymers, terpene-based resins, thermosetting resins, vulcanizing agents (e.g. sulfur), and vulcanization accelerators.

Among these additives, use of a wax is preferable. In a pneumatic tire produced by using the rubber composition of the present invention, polarity may change since a nitrone-modified moiety is contained. Therefore, migration of the wax to the surface is promoted, thereby further enhancing cracking resistance. As a result, the pneumatic tire produced by using the rubber composition of the present invention exhibits even better durability (ozone resistance).

In the rubber composition of the present invention, if a wax is added to the composition, the content of the wax is not particularly limited; however, from the perspective of appearance, the content is preferably from 1 to 2.5 parts by mass per 100 parts by mass of the diene rubber.

Method of Producing Rubber Composition

The method of producing the rubber composition of the present invention is not particularly limited, and specific examples thereof include a method whereby each of the above-mentioned components is kneaded using a publicly known method and device (e.g. Banbury mixer, kneader, roller, and the like). When the composition of the present invention contains sulfur or a vulcanization accelerator, the components other than the sulfur and the vulcanization accelerator are preferably mixed first at a high temperature (preferably 40° C. to 160° C.). After the mixture is cooled, then the sulfur and the vulcanization accelerator are mixed.

In addition, the rubber composition of the present invention can be vulcanized or crosslinked under conventional, publicly known vulcanizing or crosslinking conditions.

Application

The rubber composition of the present invention is used in production of a pneumatic tire. In particular, the rubber composition is preferably used in a tire rim cushion or rubber finishing of a pneumatic tire.

Pneumatic Tire

The pneumatic tire of the present invention is a pneumatic tire that is produced by using the rubber composition of the present invention described above. In particular, the pneumatic tire of the present invention is preferably a pneumatic tire that comprises the rubber composition of the present invention in the tire rim cushion or rubber finishing.

FIG. 1 is a partial cross-sectional schematic view of a tire that represents one embodiment of the pneumatic tire of the present invention, but the pneumatic tire of the present invention is not limited to the embodiment illustrated in FIG. 1.

In FIG. 1, reference sign 1 denotes a bead portion, reference sign 2 denotes a sidewall portion, and reference sign 3 denotes a tire tread portion.

In addition, a carcass layer 4, in which fiber cords are embedded, is mounted between a left-right pair of the bead portions 1, and ends of the carcass layer 4 are turned up around bead cores 5 and bead fillers 6 from an inner side to an outer side of the tire.

In the tire tread portion 3, a belt layer 7 is provided along the entire circumference of the tire on the outer side of the carcass layer 4.

Additionally, rim cushions 8 are provided in parts of the bead portions 1 that are in contact with a rim. Note that the rim cushion 8 illustrated in FIG. 1 is a member, a part of which has a finishing function, and the part having this function may be particularly referred to as "rubber finishing".

The pneumatic tire of the present invention can be produced, for example, in accordance with a conventionally known method. In addition to ordinary air or air with an adjusted oxygen partial pressure, inert gases such as nitrogen, argon, and helium can be used as the gas with which the tire is filled.

EXAMPLES

Hereinafter, the present invention will be further described in detail with reference to examples; however, the present invention is not limited thereto.
Synthesis of Nitrone Compound (Carboxynitrone)

In a 2 L egg-plant shaped flask, methanol heated to 40° C. (900 mL) was placed, and then terephthalaldehydic acid represented by Formula (b-1) below (30.0 g) was added and dissolved. In this solution, a solution in which phenylhydroxylamine represented by Formula (a-1) below (21.8 g) was dissolved in methanol (100 mL) was added and stirred at room temperature for 19 hours. After the completion of stirring, a nitrone compound (carboxynitrone; 41.7 g) represented by Formula (c-1) below was obtained by recrystallization from methanol. The yield was 86%.

[Formula 7]

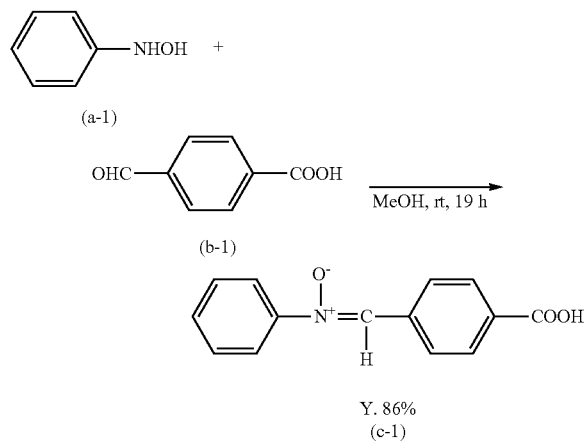

Synthesis of Modified Polymer (Modified Polymer 1)

In a Banbury mixer at 120° C., a butadiene rubber (Nipol BR1220, manufactured by Zeon Corporation) was charged and masticated for 2 minutes. Thereafter, 1 part by mass of the nitrone compound synthesized as described above was added per 100 parts by mass of the butadiene rubber, and mixed at 150° C. for 5 minutes to modify the butadiene rubber with the nitrone compound. Thus, the nitrone-modified butadiene rubber was obtained. The obtained modified polymer was used as the modified polymer 1.

When NMR measurement was performed for the obtained modified polymer 1 to determine the degree of modification, the degree of modification of the modified polymer 1 was 0.19 mol %. Specifically, the degree of modification was determined as described below. The degree of modification was determined by measuring the peak area at around 8.08 ppm (attributed to the two protons adjacent to the carboxy group) via $^1$H-NMR analysis (CDCl$_3$, 400 MHz, TMS) for the butadiene rubber before and after the modification, using CDCl$_3$ as a solvent. Note that the $^1$H-NMR measurement of the modified polymer 1 was performed by using a sample obtained by repeating the purification twice, wherein the modified polymer 1 was dissolved in toluene precipitating in methanol, and then drying under reduced pressure.
Synthesis of Modified Polymer (Modified Polymer 2)

The butadiene rubber was modified with the nitrone compound in the same manner as for the modified polymer 1 except for changing the compounded amount of the nitrone compound from 1 part by mass to 2 parts by mass. The obtained modified polymer was used as the modified polymer 2.

NMR measurement was performed for the obtained modified polymer 2 to determine the degree of modification, and the degree of modification of the modified polymer 2 was 0.41 mol %. The method of determining the degree of modification is as described above.

Comparative Examples 1 to 3 and Working Examples 1 to 9

Preparation of Rubber Composition

The components shown in Table 1 to Table 3 below were blended in the proportions (parts by mass) shown in Table 1 to Table 3.

Specifically, the components shown in Table 1 to Table 3 below except for the sulfur and the vulcanization accelerator were first mixed in a Banbury mixer at 80° C. for 5 minutes. Thereafter, a roll was used to mix in the sulfur and the vulcanization accelerator to obtain a rubber composition.
Production of Vulcanized Rubber Sheet A vulcanized rubber sheet was prepared by press-vulcanizing each of the obtained (unvulcanized) rubber compositions for 15 minutes at 160° C. in a mold (15 cm×15 cm×0.2 cm).
Evaluation of Heat Build-Up The loss tangent (tan δ (60° C.)) was measured for the obtained vulcanized rubber sheet using a viscoelastic spectrometer (manufactured by Toyo Seiki Seisaku-sho, Ltd.) under the following conditions: 10% initial strain, ±2% amplitude, 20 Hz frequency, at a temperature of 60° C. The results thereof are shown in Table 1 to Table 3 (heat build-up). The results were shown as follows: the result in Table 1 below was expressed as an index relative to tan δ (60° C.) of Comparative Example 1 as 100; the result in Table 2 below was expressed as an index relative to tan δ (60° C.) of Comparative Example 2 as 100; and the result in Table 3 below was expressed as an index relative to tan δ (60° C.) of Comparative Example 3 as 100. A smaller value indicates superior low heat build-up when formed into a tire.
Evaluation of Ozone Resistance The obtained vulcanized rubber sheet was placed in an ozone tank (50° C., 100 pphm) and allowed to stand still under a condition of 40% elongation for 48 hours. Thereafter, the vulcanized rubber sheet was observed, and the number of cracks having a length of 1 mm or greater that are present on the surface was counted. Evaluation was performed based on the criteria described below. The results are shown in Table 1 to Table 3 (ozone resistance). Practically, the evaluation result is preferably from 3 to 5, and more preferably 4 or 5.

5: no cracks of 1 mm or greater were observed.
4: 1 or more but less than 10 cracks of 1 mm or greater were observed.
3: 10 or more but 20 or less cracks of 1 mm or greater were observed.
2: 21 or more cracks of 1 mm or greater were observed.
1: the vulcanized rubber sheet was broken.

In Table 1 to Table 3 below, "CPN conversion value" indicates the amount in terms of part by mass of the nitrone compound used in the synthesis of the modified polymer relative to 100 parts by mass of the diene rubber.

Furthermore, in Table 1 to Table 3 below, "degree of modification" indicates the degree of modification of the modified polymer described above.

TABLE 1

|  | Comparative Example 1 | Working Example 1 | Working Example 2 | Working Example 3 |
|---|---|---|---|---|
| Natural rubber | 45.00 | 45.00 | 45.00 | 45.00 |
| Butadiene rubber | 55.00 | 25.00 | — | — |
| Modified polymer 1 | — | 30.00 | 55.00 | — |
| Modified polymer 2 | — | — | — | 55.00 |
| Carbon black 1 | 80.00 | 80.00 | 80.00 | 80.00 |
| Zinc oxide | 2.00 | 2.00 | 2.00 | 2.00 |
| Stearic acid | 2.00 | 2.00 | 2.00 | 2.00 |
| Anti-aging agent | 2.00 | 2.00 | 2.00 | 2.00 |
| Wax | 1.00 | 1.00 | 1.00 | 1.00 |
| Process oil | 10.00 | 10.00 | 10.00 | 10.00 |
| Vulcanization accelerator | 1.00 | 1.00 | 1.00 | 1.00 |
| Sulfur | 3.00 | 3.00 | 3.00 | 3.00 |
| CPN conversion value (parts by mass) | 0.00 | 0.30 | 0.55 | 1.10 |
| Modification conditions | — | 150° C., 5 min | 150° C., 5 min | 150° C., 5 min |
| Degree of modification (mol %) | — | 0.19 | 0.19 | 0.41 |
| Heat build-up | 100 | 95 | 89 | 87 |
| Ozone resistance | 2 | 3 | 3 | 4 |

TABLE 2

|  | Comparative Example 2 | Working Example 4 | Working Example 5 | Working Example 6 |
|---|---|---|---|---|
| Natural rubber | 45.00 | 45.00 | 45.00 | 45.00 |
| Butadiene rubber | 55.00 | 25.00 | — | — |
| Modified polymer 1 | — | 30.00 | 55.00 | — |
| Modified polymer 2 | — | — | — | 55.00 |
| Carbon black 1 | 70.00 | 70.00 | 70.00 | 70.00 |
| Zinc oxide | 2.00 | 2.00 | 2.00 | 2.00 |
| Stearic acid | 2.00 | 2.00 | 2.00 | 2.00 |
| Anti-aging agent | 2.00 | 2.00 | 2.00 | 2.00 |
| Wax | 1.00 | 1.00 | 1.00 | 1.00 |
| Process oil | 10.00 | 10.00 | 10.00 | 10.00 |
| Vulcanization accelerator | 1.00 | 1.00 | 1.00 | 1.00 |
| Sulfur | 3.00 | 3.00 | 3.00 | 3.00 |
| CPN conversion value (parts by mass) | 0.00 | 0.30 | 0.55 | 1.10 |

TABLE 2-continued

|  | Comparative Example 2 | Working Example 4 | Working Example 5 | Working Example 6 |
|---|---|---|---|---|
| Modification conditions | — | 150° C., 5 min | 150° C., 5 min | 150° C., 5 min |
| Degree of modification (mol %) | — | 0.19 | 0.19 | 0.41 |
| Heat build-up | 100 | 93 | 86 | 85 |
| Ozone resistance | 2 | 3 | 4 | 4 |

TABLE 3

|  | Comparative Example 3 | Working Example 7 | Working Example 8 | Working Example 9 |
|---|---|---|---|---|
| Natural rubber | 45.00 | 45.00 | 45.00 | 45.00 |
| Butadiene rubber | 55.00 | 25.00 | — | — |
| Modified polymer 1 | — | 30.00 | 55.00 | — |
| Modified polymer 2 | — | — | — | 55.00 |
| Carbon black 2 | 80.00 | 80.00 | 80.00 | 80.00 |
| Zinc oxide | 2.00 | 2.00 | 2.00 | 2.00 |
| Stearic acid | 2.00 | 2.00 | 2.00 | 2.00 |
| Anti-aging agent | 2.00 | 2.00 | 2.00 | 2.00 |
| Wax | 1.00 | 1.00 | 1.00 | 1.00 |
| Process oil | 10.00 | 10.00 | 10.00 | 10.00 |
| Vulcanization accelerator | 1.00 | 1.00 | 1.00 | 1.00 |
| Sulfur | 3.00 | 3.00 | 3.00 | 3.00 |
| CPN conversion value (parts by mass) | 0.00 | 0.30 | 0.55 | 1.10 |
| Modification conditions | — | 150° C., 5 min | 150° C., 5 min | 150° C., 5 min |
| Degree of modification (mol %) | — | 0.19 | 0.19 | 0.41 |
| Heat build-up | 100 | 95 | 90 | 87 |
| Ozone resistance | 2 | 3 | 3 | 4 |

The details of the components shown in Table 1 to Table 3 are as follows.

Natural rubber: TSR20

Butadiene rubber: Nipol BR1220 (manufactured by Zeon Corporation)

Modified polymer 1: Modified polymer 1 synthesized as described above

Modified polymer 2: Modified polymer 2 synthesized as described above

Carbon black 1: Seast 9 (nitrogen adsorption specific surface area: 142 m$^2$/g, manufactured by Tokai Carbon Co., Ltd.)

Carbon black 2: Seast 3 (nitrogen adsorption specific surface area: 79 m$^2$/g, manufactured by Tokai Carbon Co., Ltd.)

Zinc oxide: Zinc White No. 3 (manufactured by Seido Chemical Industry Co., Ltd.)

Stearic acid: Stearic acid YR (manufactured by NOF Corporation)

Anti-aging agent: SANTOFLEX 6PPD (manufactured by Soltia Europe)

Wax: SANNOC (manufactured by Ouchi Shinko Chemical Industrial Co., Ltd.)

Process oil: Extract No. 4 S (manufactured by Showa Shell Sekiyu K.K.)

Vulcanization accelerator: Nocceler CZ-G (manufactured by Ouchi Shinko Chemical Industrial Co., Ltd.)

Sulfur: oil treatment sulfur (manufactured by Karuizawa Refinery Ltd.)

As is clear from Table 1 to Table 3, all of Working Examples 1 to 9 which contained the modified polymer achieved excellent low heat build-up and ozone resistance when formed into tires compared to those of Comparative Examples 1 to 3 which contained no modified polymer. Furthermore, when Working Examples 1 to 3 are compared, it was found that even better low heat build-up was achieved when the introduced amount of the nitrone compound was greater. Similar tendency was observed from the comparison of Working Examples 4 to 6 and the comparison of Working Examples 7 to 9.

Furthermore, from the comparison of Working Example 2 and Working Example 3, it was found that even better ozone resistance was achieved when a modified polymer with a higher degree of modification was blended. Similar tendency was observed from the comparison of Working Example 5 and Working Example 6 and the comparison of Working Example 8 and Working Example 9.

Comparative Examples 4 to 10 and Working Examples 10 to 13

Preparation of Rubber Composition

The components shown in Table 4 below were blended in the proportions (parts by mass) shown in Table 4 below.

Specifically, the components shown in Table 4 below except for the sulfur and the vulcanization accelerator were first mixed using a Banbury mixer at 80° C. for 5 minutes. Thereafter, a roll was used to mix in the sulfur and the vulcanization accelerator to obtain a rubber composition.

Production of Vulcanized Rubber Sheet A vulcanized rubber sheet was prepared by press-vulcanizing each of the obtained (unvulcanized) rubber compositions for 15 minutes at 160° C. in a mold (15 cm×15 cm×0.2 cm).

Evaluation of Heat Build-Up

The loss tangent (tan δ (60° C.)) was measured for the obtained vulcanized rubber sheet using a viscoelastic spectrometer (manufactured by Toyo Seiki Seisaku-sho, Ltd.) under the following conditions: 10% initial strain, ±2% amplitude, 20 Hz frequency, at a temperature of 60° C. The results are shown in Table 4 below (heat build-up). The result was expressed as index value, relative to the tan δ (60° C.) of Comparative Example 4 as 100. A smaller value indicates superior low heat build-up when formed into a tire.

Evaluation of Wear Resistance

For each of the obtained vulcanized rubber sheets, the amount of wear was measured using the Pico Abrasion Tester in accordance with ASTM-D2228. The results are shown in Table 4 below (wear resistance). The result was expressed as index value, relative to the reciprocal of the result of Comparative Example 4 as 100. A larger value (i.e. less amount of wear) indicates superior wear resistance.

In Table 4 below, "CPN conversion value" indicates the amount in terms of parts by mass of the nitrone compound used in the synthesis of the modified polymer relative to 100 parts by mass of the diene rubber.

TABLE 4

|  | Comparative Example | | Working Example | | Comparative Example | Working Example | | Comparative Example | | | |
|---|---|---|---|---|---|---|---|---|---|---|---|
|  | 4 | 5 | 10 | 11 | 6 | 12 | 13 | 7 | 8 | 9 | 10 |
| Natural rubber | 45.00 | 45.00 | 45.00 | 45.00 | 45.00 | 45.00 | 45.00 | 45.00 | 45.00 | 45.00 | 45.00 |
| Butadiene rubber | 55.00 | 55.00 | 25.00 | 5.00 | 55.00 | 25.00 | 5.00 | 55.00 | 5.00 | 25.00 | 5.00 |
| Modified polymer 1 | — | — | 30.00 | 50.00 | — | 30.00 | 50.00 | — | 50.00 | 30.00 | 50.00 |
| Carbon black 1 | 80.00 | 50.00 | 50.00 | 50.00 | 10.00 | 10.00 | 10.00 | — | — | 10.00 | 10.00 |
| Silica 1 | — | 30.00 | 30.00 | 30.00 | 70.00 | 70.00 | 70.00 | 85.00 | 85.00 | 90.00 | 90.00 |
| Zinc oxide | 2.00 | 2.00 | 2.00 | 2.00 | 2.00 | 2.00 | 2.00 | 2.00 | 2.00 | 2.00 | 2.00 |
| Stearic acid | 2.00 | 2.00 | 2.00 | 2.00 | 2.00 | 2.00 | 2.00 | 2.00 | 2.00 | 2.00 | 2.00 |
| Anti-aging agent | 2.00 | 2.00 | 2.00 | 2.00 | 2.00 | 2.00 | 2.00 | 2.00 | 2.00 | 2.00 | 2.00 |
| Wax | 1.00 | 1.00 | 1.00 | 1.00 | 1.00 | 1.00 | 1.00 | 1.00 | 1.00 | 1.00 | 1.00 |
| Silane coupling agent | — | 2.40 | 2.40 | 2.40 | 5.60 | 5.60 | 5.60 | 6.80 | 6.80 | 6.40 | 6.40 |
| Process oil | 10.00 | 10.00 | 10.00 | 10.00 | 10.00 | 10.00 | 10.00 | 10.00 | 10.00 | 10.00 | 10.00 |
| Vulcanization accelerator | 1.00 | 1.00 | 1.00 | 1.00 | 1.00 | 1.00 | 1.00 | 1.00 | 1.00 | 1.00 | 1.00 |
| Sulfur | 3.00 | 3.00 | 3.00 | 3.00 | 3.00 | 3.00 | 3.00 | 3.00 | 3.00 | 3.00 | 3.00 |
| CPN conversion value (parts by mass) | 0.00 | 0.00 | 0.30 | 0.50 | 0.00 | 0.30 | 0.50 | 0.00 | 0.50 | 0.30 | 0.50 |
| Heat build-up | 100 | 104 | 96 | 90 | 106 | 95 | 88 | 105 | 98 | 111 | 109 |
| Wear resistance | 100 | 94 | 106 | 111 | 91 | 104 | 107 | 91 | 94 | 97 | 96 |

The details of each component shown in Table 4 above are as follows.

Natural rubber: TSR20

Butadiene rubber: Nipol BR1220 (manufactured by Zeon Corporation)

Modified polymer 1: Modified polymer 1 synthesized as described above

Carbon black 1: Seast 9 (nitrogen adsorption specific surface area: 142 $m^2/g$, manufactured by Tokai Carbon Co., Ltd.)

Silica: ZEOSIL 165GR (CTAB adsorption specific surface area: 155 $m^2/g$, manufactured by Rhodia Silica Korea Co., Ltd.)

Zinc oxide: Zinc White No. 3 (manufactured by Seido Chemical Industry Co., Ltd.)

Stearic acid: Stearic acid YR (manufactured by NOF Corporation)

Anti-aging agent: SANTOFLEX 6PPD (manufactured by Soltia Europe)

Wax: SANNOC (manufactured by Ouchi Shinko Chemical Industrial Co., Ltd.)

Silane coupling agent: Si69 (manufactured by Evonik Degussa)

Process oil: Extract No. 4 S (manufactured by Showa Shell Sekiyu K.K.)

Vulcanization accelerator: Nocceler CZ-G (manufactured by Ouchi Shinko Chemical Industrial Co., Ltd.)

Sulfur: oil treatment sulfur (manufactured by Karuizawa Refinery Ltd.)

As is clear from Table 4, all of Working Examples 10 to 13 which contained the modified polymer, carbon black, and silica exhibited excellent low heat build-up and wear resistance compared to those of Comparative Example 4 which contained no modified polymer and no silica.

Furthermore, all of Working Examples 10 to 13 which contained the modified polymer achieved excellent low heat build-up and wear resistance compared to those of Comparative Examples 5 and 6 which contained the silica but contained no modified polymer.

Furthermore, when Working Example 10 and Working Example 11 are compared, Working Example 11 which contained a larger amount of the nitrone compound exhibited even better low heat build-up and wear resistance. The same trend was observed in the comparison of Working Example 12 and Working Example 13.

Furthermore, when Working Example 10 and Working Example 12 are compared, Working Example 10 which had the mass ratio of the carbon black to the silica of 1 or greater exhibited even better wear resistance, and Working Example 12 which had the mass ratio of less than 1 exhibited even better low heat build-up. The same trend was observed in the comparison of Working Example 11 and Working Example 13.

In contrast, Comparative Examples 5 and 6 which contained the silica but contained no modified polymer exhibited poor low heat build-up and wear resistance compared to those of Comparative Example 4.

Furthermore, Comparative Example 7 which contained the silica but contained no modified polymer and no carbon black exhibited poor low heat build-up and wear resistance compared to those of Comparative Example 4.

Furthermore, Comparative Example 8 which contained the modified polymer and the silica but contained no carbon black exhibited poor wear resistance compared to that of Comparative Example 4.

Furthermore, Comparative Examples 9 and 10 which contained the modified polymer, carbon black, and silica but had the total content of the carbon black and the silica exceeding the range of 60 to 90 parts by mass per 100 parts by mass of the diene rubber exhibited poor low heat build-up and wear resistance compared to those of Comparative Example 4.

REFERENCE SIGNS LIST

1 Bead portion
2 Side wall portion
3 Tire tread portion
4 Carcass layer
5 Bead core
6 Bead filler
7 Belt layer
8 Rim cushion

The invention claimed is:

1. A rubber composition for a tire rim cushion or rubber finishing, the rubber composition comprising: a diene rubber and a filler containing a carbon black;
   the diene rubber containing a natural rubber and/or an isoprene rubber, and a modified polymer that is obtained by reacting a nitrone compound having a carboxy group with a double bond of a conjugated diene polymer;
   a content of the natural rubber and/or the isoprene rubber in the diene rubber being from 30 to 60 mass %;
   a content of the modified polymer in the diene rubber being from 8 to 70 mass %;
   a content of the filler being from 60 to 90 parts by mass per 100 parts by mass of the diene rubber; and
   a nitrogen adsorption specific surface area of the carbon black being from 60 to 150 $m^2/g$.

2. The rubber composition for a tire rim cushion or rubber finishing according to claim 1, wherein the diene rubber contains the natural rubber,
   a content of the natural rubber in the diene rubber is from 30 to 60 mass %, and
   a content of the carbon black is from 67 to 90 parts by mass per 100 parts by mass of the diene rubber.

3. The rubber composition for a tire rim cushion or rubber finishing according to claim 1, wherein the filler further contains silica,
   a content of the carbon black is from 5 to 85 parts by mass per 100 parts by mass of the diene rubber,
   a content of the silica is from 5 to 85 parts by mass per 100 parts by mass of the diene rubber, and
   a total content of the carbon black and the silica is from 60 to 90 parts by mass per 100 parts by mass of the diene rubber.

4. The rubber composition for a tire rim cushion or rubber finishing according to claim 3, wherein a CTAB adsorption specific surface area of the silica is from 50 to 230 $m^2/g$.

5. The rubber composition for a tire rim cushion or rubber finishing according to claim 1, wherein the nitrone compound is a compound selected from the group consisting of N-phenyl-α-(4-carboxyphenyl)nitrone, N-phenyl-α-(3-carboxyphenyl)nitrone, N-phenyl-α-(2-carboxyphenyl)nitrone, N-(4-carboxyphenyl)-α-phenylnitrone, N-(3-carboxyphenyl)-α-phenylnitrone, and N-(2-carboxyphenyl)-α-phenylnitrone.

6. The rubber composition for a tire rim cushion or rubber finishing according to claim 1, wherein a degree of modification of the modified polymer is from 0.02 to 4.0 mol %, where "degree of modification" refers to a proportion (mol %) of double bonds modified with the nitrone compound relative to all the double bonds of conjugated diene contained in the conjugated diene polymer.

7. The rubber composition for a tire rim cushion or rubber finishing according to claim 1, wherein an amount of the nitrone compound that is reacted with the double bond of the conjugated diene polymer is from 0.1 to 10 parts by mass per 100 parts by mass of the diene rubber.

8. The rubber composition for a tire rim cushion or rubber finishing according to claim 1, wherein the modified polymer is a modified polymer obtained by reacting a nitrone compound with a double bond of a butadiene rubber.

9. A pneumatic tire comprising the rubber composition described in claim 1 in a tire rim cushion or rubber finishing.

10. The rubber composition for a tire rim cushion or rubber finishing according to claim 2, wherein the nitrone compound is a compound selected from the group consisting of N-phenyl-α-(4-carboxyphenyl)nitrone, N-phenyl-α-(3-carboxyphenyl)nitrone, N-phenyl-α-(2-carboxyphenyl)nitrone, N-(4-carboxyphenyl)-α-phenylnitrone, N-(3-carboxyphenyl)-α-phenylnitrone, and N-(2-carboxyphenyl)-α-phenylnitrone.

11. The rubber composition for a tire rim cushion or rubber finishing according to claim 3, wherein the nitrone compound is a compound selected from the group consisting of N-phenyl-α-(4-carboxyphenyl)nitrone, N-phenyl-α-(3-carboxyphenyl)nitrone, N-phenyl-α-(2-carboxyphenyl)nitrone, N-(4-carboxyphenyl)-α-phenylnitrone, N-(3-carboxyphenyl)-α-phenylnitrone, and N-(2-carboxyphenyl)-α-phenylnitrone.

12. The rubber composition for a tire rim cushion or rubber finishing according to claim 4, wherein the nitrone compound is a compound selected from the group consisting of N-phenyl-α-(4-carboxyphenyl)nitrone, N-phenyl-α-(3-carboxyphenyl)nitrone, N-phenyl-α-(2-carboxyphenyl)nitrone, N-(4-carboxyphenyl)-α-phenylnitrone, N-(3-carboxyphenyl)-α-phenylnitrone, and N-(2-carboxyphenyl)-α-phenylnitrone.

13. The rubber composition for a tire rim cushion or rubber finishing according to claim 2, wherein a degree of modification of the modified polymer is from 0.02 to 4.0 mol %, where "degree of modification" refers to a proportion (mol %) of double bonds modified with the nitrone compound relative to all the double bonds of conjugated diene contained in the conjugated diene polymer.

14. The rubber composition for a tire rim cushion or rubber finishing according to claim 3, wherein a degree of modification of the modified polymer is from 0.02 to 4.0 mol %, where "degree of modification" refers to a proportion (mol %) of double bonds modified with the nitrone compound relative to all the double bonds of conjugated diene contained in the conjugated diene polymer.

15. The rubber composition for a tire rim cushion or rubber finishing according to claim 4, wherein a degree of modification of the modified polymer is from 0.02 to 4.0 mol %, where "degree of modification" refers to a proportion (mol %) of double bonds modified with the nitrone compound relative to all the double bonds of conjugated diene contained in the conjugated diene polymer.

16. The rubber composition for a tire rim cushion or rubber finishing according to claim 5, wherein a degree of modification of the modified polymer is from 0.02 to 4.0 mol %, where "degree of modification" refers to a proportion (mol %) of double bonds modified with the nitrone compound relative to all the double bonds of conjugated diene contained in the conjugated diene polymer.

17. The rubber composition for a tire rim cushion or rubber finishing according to claim 10, wherein a degree of modification of the modified polymer is from 0.02 to 4.0 mol %, where "degree of modification" refers to a proportion (mol %) of double bonds modified with the nitrone compound relative to all the double bonds of conjugated diene contained in the conjugated diene polymer.

18. The rubber composition for a tire rim cushion or rubber finishing according to claim 11, wherein a degree of modification of the modified polymer is from 0.02 to 4.0 mol %, where "degree of modification" refers to a proportion (mol %) of double bonds modified with the nitrone compound relative to all the double bonds of conjugated diene contained in the conjugated diene polymer.

19. The rubber composition for a tire rim cushion or rubber finishing according to claim 12, wherein a degree of modification of the modified polymer is from 0.02 to 4.0 mol %, where "degree of modification" refers to a proportion (mol %) of double bonds modified with the nitrone compound relative to all the double bonds of conjugated diene contained in the conjugated diene polymer.

* * * * *